(12) United States Patent  
Yuan

(10) Patent No.: US 7,760,288 B2  
(45) Date of Patent: Jul. 20, 2010

(54) BACKLIGHT MODULE AND LIQUID CRYSTAL DISPLAY USING SAME

(75) Inventor: Xue-Mei Yuan, Shenzhen (CN)

(73) Assignees: Innocom Technology (Shenzhen) Co., Ltd., Shenzhen, Guangdong Province (CN); Innolux Display Corp., Miao-Li County (TW)

( * ) Notice: Subject to any disclaimer, the term of this patent is extended or adjusted under 35 U.S.C. 154(b) by 168 days.

(21) Appl. No.: 12/150,263

(22) Filed: Apr. 25, 2008

(65) Prior Publication Data

US 2008/0278656 A1    Nov. 13, 2008

(30) Foreign Application Priority Data

Apr. 25, 2007    (CN) .......................... 2007 1 0074214

(51) Int. Cl.
    *G02F 1/1333*    (2006.01)
(52) U.S. Cl. .......................... 349/58; 349/65; 362/633; 362/615
(58) Field of Classification Search .................... 349/58, 349/65, 64, 67, 70; 362/632–634, 614, 615, 362/609

See application file for complete search history.

(56) References Cited

U.S. PATENT DOCUMENTS

| 6,753,843 | B2 | 6/2004 | Wang |
| 6,976,781 | B2 | 12/2005 | Chu et al. |
| 7,033,063 | B2 * | 4/2006 | Cha et al. .................... 362/632 |
| 7,156,534 | B2 * | 1/2007 | Hwang et al. ............... 362/633 |
| 2002/0093811 | A1 | 7/2002 | Chen |
| 2007/0030701 | A1 | 2/2007 | Chang |

FOREIGN PATENT DOCUMENTS

CN                1837929 A        9/2006

* cited by examiner

*Primary Examiner*—Thoi V Duong  
(74) *Attorney, Agent, or Firm*—Wei Te Chung

(57) ABSTRACT

An exemplary backlight module (20) includes a frame (21), a light guide plate (25), and a fixing member (22). The frame includes a substantially rectangular bottom plate (210), and a first, a second, and a third side walls (211, 212, 213) upwardly extending from three edges of the bottom plate. The first side wall is opposite and parallel to the third side wall. A first spacing board (214) inwardly extends from the first side wall. The first spacing board, the first side wall, and the bottom plate cooperatively define a first sliding channel. The light guide plate is accommodated in the first sliding channel of the frame. The fixing member is detachably secured to the frame such that the light guide plate is fixedly accommodated in the frame.

15 Claims, 4 Drawing Sheets

BACKLIGHT MODULE AND LIQUID CRYSTAL DISPLAY USING SAME

BACKGROUND

1. Field of the Invention

The present invention relates to backlight modules used in liquid crystal displays, more particularly to a backlight module including a fixing member and to a liquid crystal display using the backlight module.

2. General Background

Liquid crystal displays are commonly used as display devices for compact electronic apparatuses, not only because they provide good quality images but also because they are very thin. Liquid crystal in a liquid crystal display does not emit any light itself. The liquid crystal requires a light source so as to be able to clearly and sharply display text and images. Therefore, a typical liquid crystal display requires an accompanying backlight module.

Referring to FIG. 5, a typical backlight module 10 includes a top plastic frame 12, a light guide plate 14, a light source 16, and a metal bottom tray 18. The top frame 12 includes four side walls 122 integrally arranged end to end, and a peripheral spacing board 124 inwardly extending from inner surfaces (not labeled) of the side walls 122. A plurality of protrusions (not labeled) outwardly extend from outer surfaces (not labeled) of the side walls 122. The bottom tray 18 includes a bottom plate 184, and four side plates 182 upwardly extending from edges of the bottom plate 184. A plurality of notches 186 are defined in the side plates 182, respectively corresponding to the protrusions of the top frame 12. The light source 16 is located adjacent to a long side edge of the light guide plate 14. The light guide plate 14 includes a light incident surface 142, a light emission surface 144 substantially perpendicularly adjoining the light incident surface 142, and a bottom surface 146 opposite and parallel to the light emission surface 144.

When the backlight module 10 is assembled, the light guide plate 14 and the light source 16 are accommodated in the bottom tray 18. Then the protrusions of the top frame 12 are respectively received in the notches 186 of the bottom tray 18. Thereby, the top frame 12 and the bottom tray 18 are secured with each other.

However, in the assembling process of the backlight module 10, the four side walls 122 of the top frame 12 are secured to the four side plates 182 of the bottom tray 18 respectively, and in a disassembling process of the backlight module 10, the four side walls 122 need to be demounted from the four side plates 182. These steps make the assembling and disassembling processes of the backlight module 10 somewhat complicated, and waste time. In addition, in the steps of securing the top frame 12 to the bottom tray 18 and demounting the top frame 12 from the bottom tray 18, the side walls 122 of the top frame 12 need be pulled outwardly such that the top frame 12 is liable to be deformed, thus impairing reliability of the backlight module 10. Furthermore, the metal bottom tray 18 is costly in terms of the shaping required and the material consumed, thus adding to the cost of manufacturing the backlight module 10.

What is needed, therefore, is a backlight module which can overcome the above-described problems. What is also needed is a liquid crystal display using such backlight module.

SUMMARY

In one preferred embodiment, a backlight module includes a frame, a light guide plate, and a fixing member. The frame includes a substantially rectangular bottom plate, and a first, a second, and a third side walls upwardly extending from three edges of the bottom plate. The first side wall is opposite and parallel to the third side wall. A first spacing board inwardly extends from the first side wall. The first spacing board, the first side wall, and the bottom plate cooperatively define a first sliding channel. The light guide plate is accommodated in the first sliding channel of the frame. The fixing member is detachably secured to the frame such that the light guide plate is fixedly accommodated in the frame.

Other novel features and advantages will become more apparent from the following detailed description when taken in conjunction with the accompanying drawings.

DETAILED DESCRIPTION OF PREFERRED EMBODIMENTS

Figure 1:
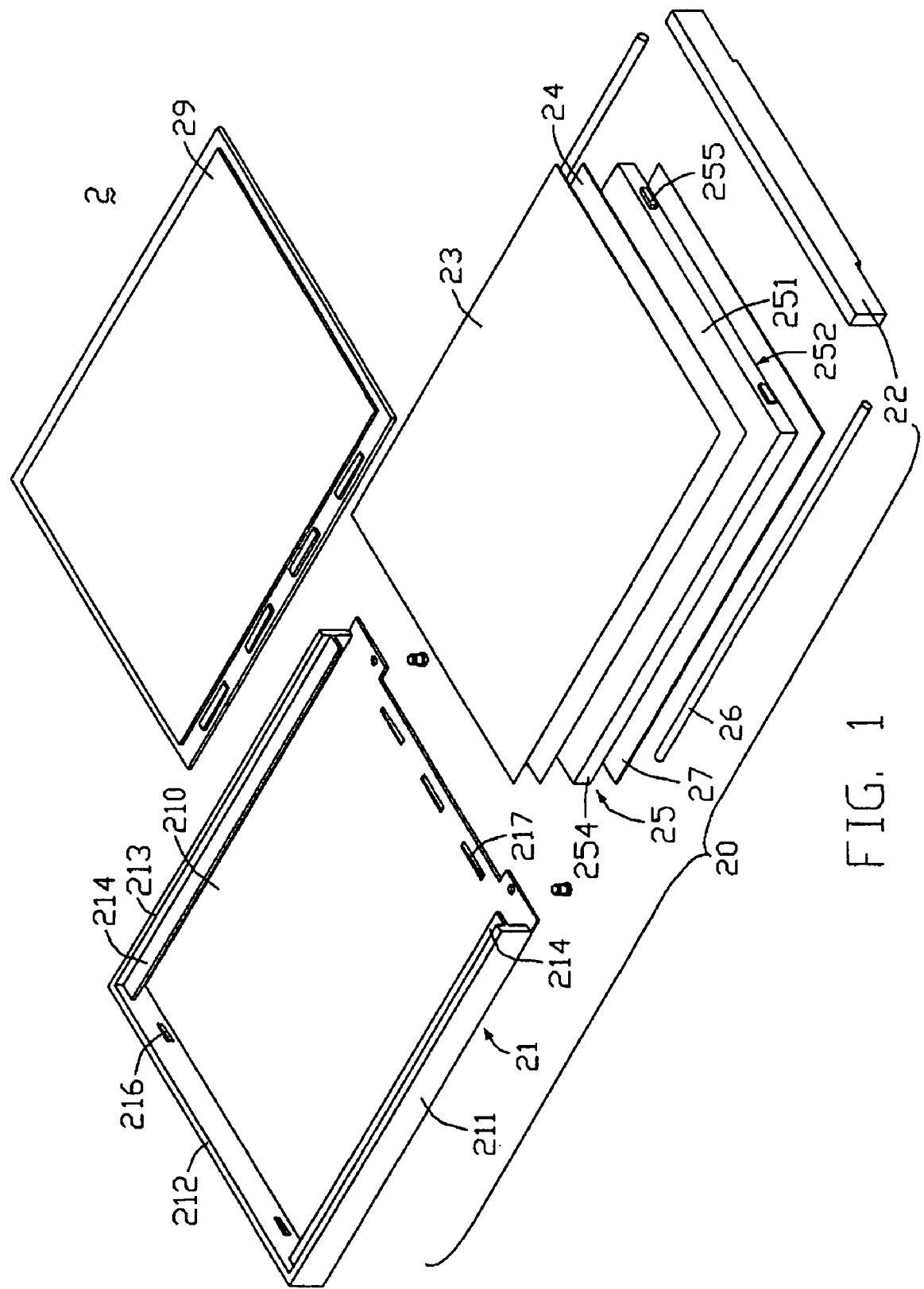
FIG. 1 is an exploded, isometric view of a liquid crystal display according to an exemplary embodiment of the present invention, the liquid crystal display including a backlight module, the backlight module including a frame and a fixing bar.

Referring to FIG. 1, a liquid crystal display 2 according to an exemplary embodiment of the present invention is shown. The liquid crystal display 2 includes a liquid crystal panel 29 and a backlight module 20 adjacent to the liquid crystal panel 29. The backlight module 20 is configured to provide plane light for the liquid crystal panel 29.

The backlight module 20 includes a brightness enhancement film (BEF) 23, a diffusing film 24, a light guide plate 25, two linear light sources 26, a reflecting film 27, a plastic frame 21, and a fixing bar 22. The frame 21 accommodates the BEF 23, the diffusing film 24, the light guide plate 25, the reflecting film 27, and the light sources 26.

The light guide plate 25 is substantially rectangular. The light guide plate 25 includes a top light emission surface 251, a bottom surface 252 parallel to the light emission surface 251, two opposite side surfaces 253 between the light emission surface 251 and the bottom surface 252, and two opposite light incident surfaces 254 between the light emission surface 251 and the bottom surface 252. The side surfaces 253 and the light incident surfaces 254 are connected end to end. The side surfaces 254 each include two first protrusions 255 outwardly extending therefrom. The two light sources 26 are located adjacent to the two light incident surfaces 254 respectively. The BEF 23 and the diffusing film 24 are arranged adjacent to the light emission surface 251 of the light guide plate 25 in that order from top to bottom. The reflecting film 27 is located adjacent to the bottom surface 252 of the light guide plate 25.

The frame 21 includes a rectangular bottom plate 210, and a first side wall 211, a second side wall 212, and a third side wall 213 upwardly extending from three edges of the bottom plate 210 respectively. The bottom plate 210 and the three side walls 211, 212, 213 cooperatively define an accommodating space (not labeled) which has an opening adjacent to the other edge of the bottom plate 210. A spacing board 214 perpendicularly extends from an inner surface of each of the first and third side walls 211, 213. The spacing boards 214 are substantially parallel to the bottom plate 210. The first side wall 211, the corresponding one of the spacing boards 214, and the bottom plate 210 cooperatively define a sliding channel. The third side wall 213, the corresponding one of the spacing boards 214, and the bottom plate 210 also cooperatively define a sliding channel. The second side wall 212 includes two first notches 216 defined therein. The first notches 216 correspond to the first protrusions 255 of one of the side surfaces 253 of the light guide plate 25. The bottom plate 210 includes a plurality of second notches 217 defined therein adjacent to the opening of the accommodating space.

Figure 2:
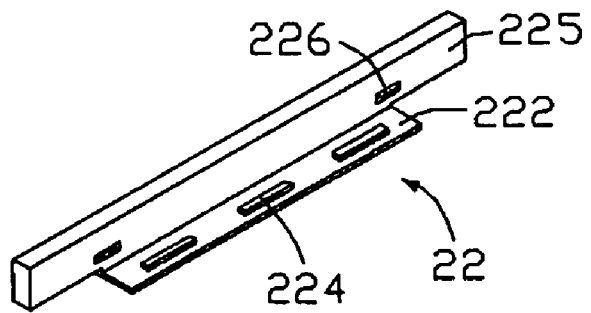
FIG. 2 is an isometric view of the fixing bar of FIG. 1.

Referring also to FIG. 2, the fixing bar 22 includes first wall 222 and a second wall 225 substantially perpendicularly connected with each other, thereby defining a substantially L-shaped figure. The first wall 222 includes a plurality of second protrusions 224 outwardly extending therefrom. The second protrusions 224 correspond to the second notches 217 of the bottom plate 210 of the frame 21 respectively. The second wall 225 includes two third notches 226 defined therein. The third notches 226 correspond to the first protrusions 255 of the other side surface 253 of the light guide plate 25. The fixing bar 22 can for example be made from plastic material.

Figure 3:
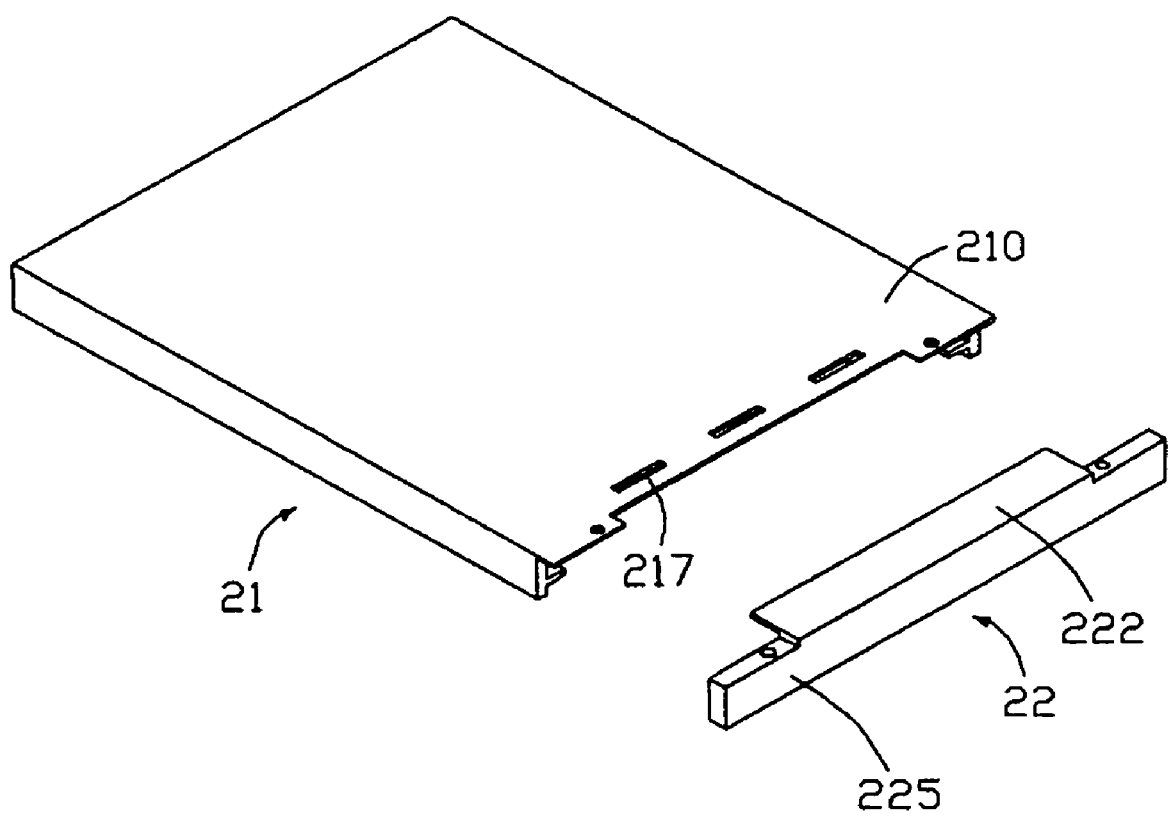
FIG. 3 is an isometric view showing the frame and the fixing bar of FIG. 1.
Figure 4:
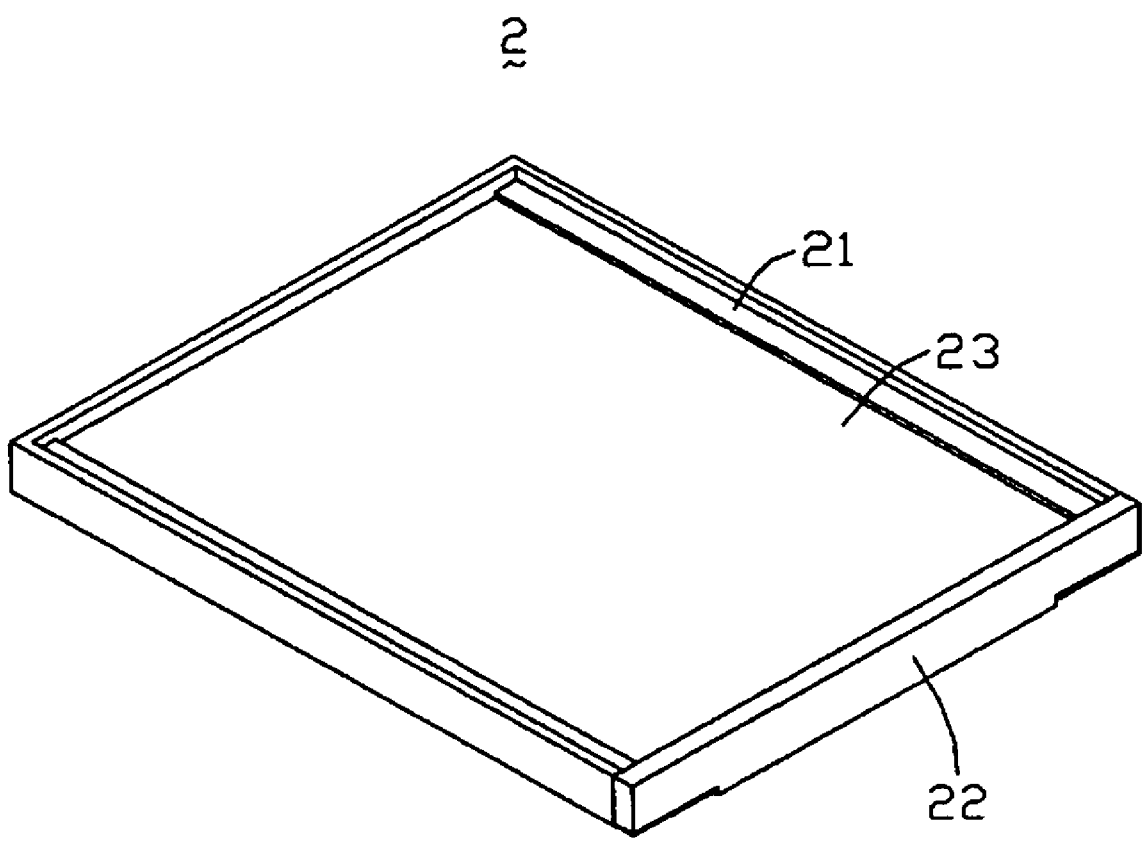
FIG. 4 is an assembled, isometric view of the backlight module of FIG. 1.
Figure 5:
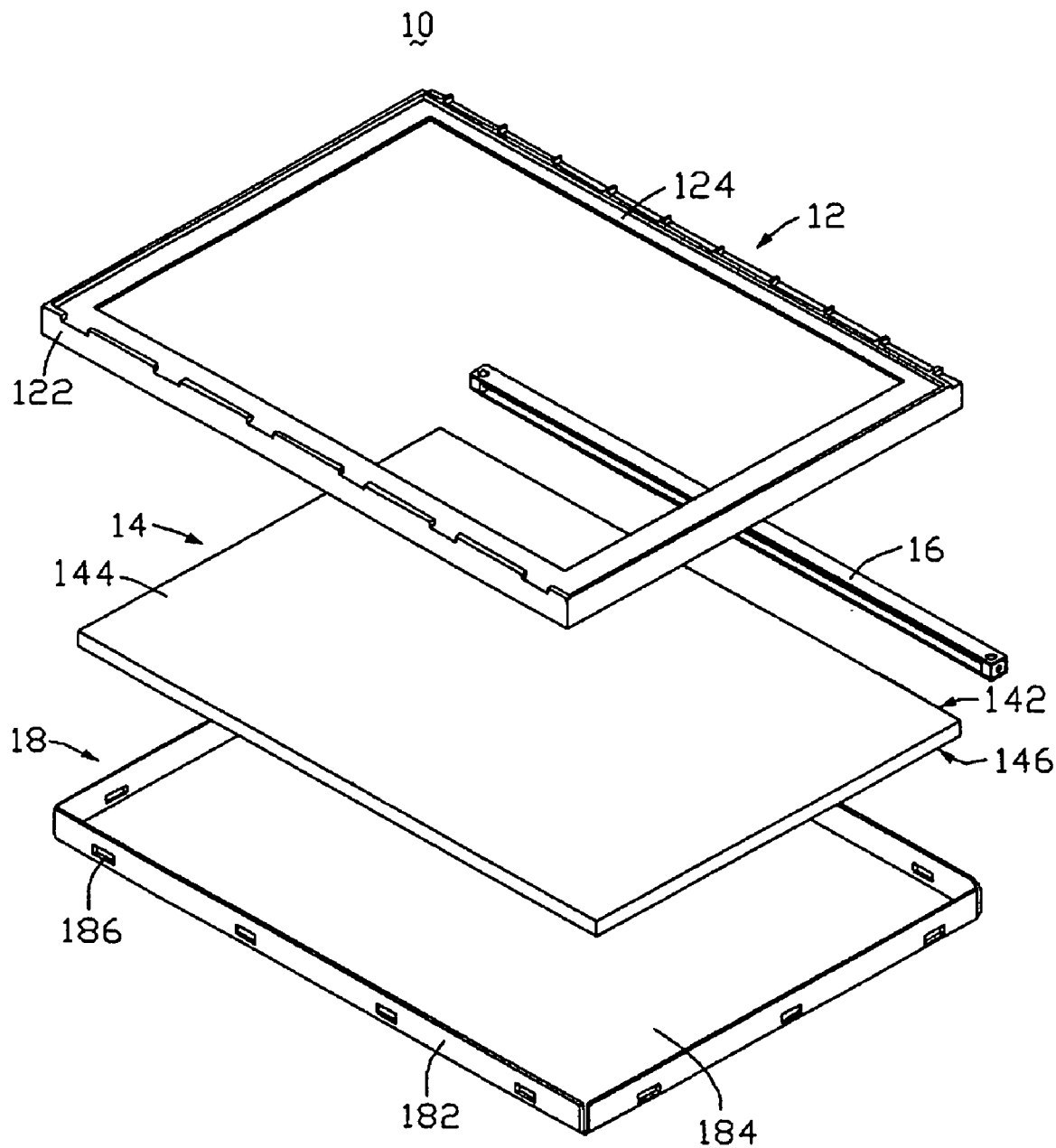
FIG. 5 is an exploded, isometric view of a conventional backlight module.

Referring to FIG. 3 and FIG. 4, two stages in a process of assembling the backlight module 20 are shown. The process of assembling the backlight module 20 is typically as follows. The light guide plate 25 is placed on the reflecting film 27 with the bottom surface 252 facing the reflecting film 27. The BEF 23 and the diffusing film 24 are placed on the light emission surface 251 of the light guide plate 25. The light sources 26 are placed adjacent to the light incident surfaces 253 of the light guide plate 25 respectively. The above elements are inserted into the frame 21 from the opening of the accommodating space along the sliding channels with one of the side surfaces 253 facing the opening until the protrusions 255 of the side surface 253 are received in the first notches 216 of the second side wall 212 of the frame 21. The first protrusions 255 of the light guide plate 25 adjacent to the opening are respectively received in the third notches 226 of the fixing bar 22, and the second protrusions 224 of the fixing bar 22 are respectively received in the second notches 217 of the frame 21, such that the fixing bar 22 is secured with the frame 21 and the light guide plate 25 respectively. Thus, the BEF 23, the diffusion film 24, the light guide plate 25, the reflecting film 27, and the light sources 26 are fixedly accommodated in the accommodating space defined by the frame 21. If desired, a plurality of screws (not labeled) can be used to further fix the fixing bar 22 to the frame 21.

In the process of disassembling the backlight module 20, the fixing bar 22 is detached such that the films, the light guide plate 25, and the light sources 26 can be taken out from the frame 21. The process is simple and convenient.

Unlike a conventional backlight module, the BEF 23, the diffusing film 24, the light guide plate 25, the light sources 26 and the reflecting film 27 can be inserted into the frame 21 along the sliding channels, and fixedly accommodated in the frame 21 by the engagement of the fixing bar 22 and the frame 21. When disassembling the backlight module 20, only the fixing bar 22 needs to be detached. Therefore the frame 21 undergoes little or no deformation. Thus, the assembling and disassembling processes of the backlight module 20 as well as the liquid crystal display 2 are both simple and convenient, and the backlight module 20 as well as the liquid crystal display 2 has improved reliability. In addition, the backlight module 20 does not include a costly metal bottom tray, thus reducing the cost of the backlight module 20 and the liquid crystal display 2.

Further or alternative embodiments may include the following. In a first example, the second side wall 212 of the frame 21 includes three protrusions outwardly extending therefrom, and the second wall 225 of the fixing bar 22 includes three protrusions outwardly extending therefrom. In such case, the first protrusions 255 of the light guide plate 25 fittingly engaged with the protrusions of the second side wall 212 of the frame 21 and the second wall 225 of the fixing bar 22, respectively. In a second example, only one spacing board 214 outwardly extends from one of the first and third side walls 211, 213 of the frame 21, thereby defining one sliding channel. In a third example, the quantity of the protrusions and the notches can vary according to requirements.

It is to be further understood that even though numerous characteristics and advantages of the present embodiments have been set out in the foregoing description, together with details of the structures and functions of the embodiments, the disclosure is illustrative only; and that changes may be made in detail, especially in matters of shape, size and arrangement of parts within the principles of the invention to the full extent indicated by the broad general meaning of the terms in which the appended claims are expressed.

What is claimed is:

1. A backlight module comprising:
a frame comprising a substantially rectangular bottom plate, and a first, a second, and a third side walls upwardly extending from three edges of the bottom plate, the first side wall being opposite and parallel to the third side wall, a first spacing board inwardly extending from the first side wall, the first spacing board, the first side wall, and the bottom plate cooperatively defining a first sliding channel;
a light guide plate accommodated in the first sliding channel of the frame, the light guide plate comprising a light emission surface, a bottom surface opposite to the light emission surface, a light incident surface between the light emission surface and the bottom surface, and two opposite side surfaces between the light emission surface and the bottom surface; and
a fixing member detachably secured to the frame such that the light guide plate is fixedly accommodated in the frame, wherein each of the side surfaces of the light guide plate is parallel to the second side wall of the frame, and comprises a first protrusion outwardly extending therefrom.

2. The backlight module in claim 1, further comprising a light source, the light source provided adjacent to the light incident surface of the light guide plate.

3. The backlight module in claim 1, wherein a second spacing board inwardly extends from the third side wall, the second spacing board, the side wall, and the bottom plate defining a second sliding channel, the first and second sliding channels being symmetrical, the light guide plate being also accommodated in the second channel.

4. The backlight module in claim 1, wherein the fixing member comprises a first wall and a second wall substantially perpendicularly connected with the first wall, the first wall comprising a second protrusion outwardly extending therefrom.

5. The backlight module in claim 4, wherein the second side wall of the frame comprises a first notch defined therein, and the bottom plate comprising a second notch defined therein, the first protrusion of one of the side surface of the light guide plate being received in the first notch of the second side wall of the frame, the second protrusion of the first wall of the fixing member being received in the second notch of the bottom plate of the frame.

6. The backlight module in claim 5, wherein the second wall of the fixing member comprises a third notch defined therein, the first protrusion of the other side surface of the light guide plate being received in the third notch.

7. The backlight module in claim 6, further comprising a plurality of screws, the screws fixing the fixing member to the frame.

8. The backlight module in claim 1, further comprising a diffusing film provided adjacent to the light emission surface of the light guide plate, a brightness enhancement film provided adjacent to the diffusion film, and a reflecting film provided adjacent to the bottom surface of the light guide plate.

9. A liquid crystal display comprising:
a liquid crystal panel; and
a backlight module provided adjacent to the liquid crystal panel, the backlight module comprising:
a frame comprising a substantially rectangular bottom plate, and a first, a second, and a third side walls upwardly extending from three edges of the bottom plate, the first side wall being opposite and parallel to the third side wall, a first spacing board inwardly extending from the first side wall, the first spacing board, the first side wall, and the bottom plate cooperatively defining a sliding channel;
a light guide plate accommodated in the first sliding channel of the frame, the light guide plate comprising a light emission surface, a bottom surface opposite to the light emission surface, a light incident surface between the light emission surface and the bottom surface, and two opposite side surfaces between the light emission surface and the bottom surface; and
a fixing member detachably secured to the other edge of the frame, wherein each of the side surfaces of the light guide plate is parallel to the second side wall of the frame, and comprises a first protrusion outwardly extending therefrom.

10. The liquid crystal display in claim 9, wherein a second spacing board inwardly extends from the third side wall of the frame, the second spacing board, the side wall, and the bottom plate defining a second sliding channel, the first and second sliding channels being symmetrical, the light guide plate being also accommodated in the second channel.

11. The liquid crystal display in claim 9, wherein the fixing member comprises a first wall and a second wall substantially perpendicularly connected with the first wall, the first wall comprising a second protrusion outwardly extending therefrom.

12. The liquid crystal display in claim 11, wherein the second side wall of the frame comprises a first notch defined therein, and the bottom plate comprising a second notch defined therein, the first protrusion of one of the side surface of the light guide plate being received in the first notch of the second side wall of the frame, the second protrusion of the first wall of the fixing member being received in the second notch of the bottom plate of the frame.

13. The liquid crystal display in claim 12, wherein the second wall of the fixing member comprises a third notch defined therein, the first protrusion of the other side surface of the light guide plate being received in the third notch.

14. The liquid crystal display in claim 13, wherein the backlight module further comprises a plurality of screws, the screws configured to fix the fixing member to the frame.

15. The liquid crystal display in claim 9, wherein the backlight module further comprises a diffusing film provided adjacent to the light emission surface of the light guide plate, a brightness enhancement film provided adjacent to the diffusion film, a reflecting film provided adjacent to the bottom surface of the light guide plate, and a light source provided adjacent to the light incident surface of the light guide plate.

* * * * *